United States Patent Office 3,226,361
Patented Dec. 28, 1965

3,226,361
FUNCTIONAL AROMATIC SUBSTITUENTS IN POLYPHENYLENE OXIDES
Willem F. H. Borman, Lee, Mass., assignor to General Electric Company, a corporation of New York
No Drawing. Filed Nov. 29, 1961, Ser. No. 155,826
10 Claims. (Cl. 260—47)

This invention relates to compositions of matter derived from polyphenylene oxides or ethers; more particularly, the invention relates to resins and membranes obtainable from aryl-substituted polyphenylene oxides and ethers.

Hay application Serial No. 69,245, filed November 15, 1960, now abandoned, which is assigned to the same assignee as the present application, discloses a polyphenylene ether having a repeating structural unit of the formula:

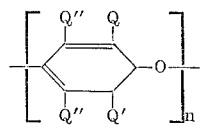

wherein the oxygen atom of one unit is connected to the benzene nucleus of the adjoining unit, n is a positive integer and is at least 100, Q is a monovalent substituent selected from the group consisting of hydrogen, aliphatic hydrocarbon radicals free of a tertiary α-carbon atom, and aliphatic halohydrocarbon radicals having at least two carbon atoms and being free of a tertiary α-carbon atom, Q′ and Q″ are both monovalent substituents which are the same as R and in addition halogen, arylhydrocarbon radicals, haloarylhydrocarbon radicals, hydrocarbonoxy radicals having at least two carbon atoms and being free of aliphatic tertiary α-carbon atom, and halohydrocarbonoxy radicals having at least two carbon atoms and being free of an aliphatic tertiary α-carbon atom.

These polyphenylene ethers are produced by reacting oxygen in the presence of a tertiary amine and a cuprous salt soluble in the tertiary amine and capable of existing in the cupric state, with a phenol having the structural formula:

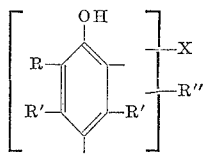

where X is a substituent selected from the group consisting of hydrogen, chlorine, bromine and iodine; R is a monovalent substituent selected from the group consisting of hydrogen, hydrocarbon radicals, and halohydrocarbon radicals having at least two carbon atoms, hydrocarbonoxy radicals and halohydrocarbonoxy radicals having at least two carbon atoms; R′ and R″ are the same as R and in addition halogen. The polyphenylene ethers described above possess such interesting properties as high heat stability, high tensile strength, and excellent electrical properties. Of particular interest is the polymer derived from 2,6-dimethylphenol. Another interesting polymer is that derived from 2-methyl-6-ethylphenol. The polymer derived from o-cresol is also of interest.

One of the objects of the present invention is to provide aryl-substituted polyphenylene ethers having ion exchange properties.

Another object of the invention is to provide a resin composed of aryl-substituted polyphenylene ethers.

Another object of the invention is to provide a membrane composed of aryl-substituted polyphenylene ethers.

A further object of the invention is to provide an ion exchange material composed of aryl-substituted polyphenylene ethers.

Other objects of the invention will be apparent from the following specification. Briefly stated, in accordance with one of its aspects, the invention is directed to a composition of matter having a repeated structural unit of the formula:

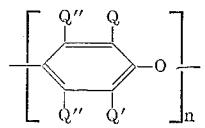

wherein the oxygen atom of one unit is connected to the benzene nucleus of the adjoining unit, n is a positive integer and is at least 100, Q is a monovalent substituent selected from the group consisting of hydrogen, aliphatic hydrocarbon radicals free of a tertiary α-carbon atom, aliphatic hydrocarbon radicals having at least two carbon atoms and being free of a tertiary α-carbon atom; Q′ is a monovalent substituent which is the same as Q and in addition halogen, arylhydrocarbon radicals, haloarylhydrocarbon radicals, hydrocarbonoxy radicals having at least two carbon atoms and being free of an aliphatic tertiary α-carbon atom, and halohydrocarbonoxy radicals having at least two carbon atoms and being free of an aliphatic tertiary α-carbon atom; and Q″ is the same as Q′ and in addition nitro, primary, secondary or tertiary amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$, there being at least one member selected from the group consisting of nitro, primary, secondary or tertiary amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$ present in a substantial portion of the units.

Aryl substitution of polyphenylene ethers is effected in accordance with the present invention through a series of steps beginning with nitration. Nitration can readily be achieved by reaction of the polyphenylene ether with nitric acid. Variation of the concentration of the nitric acid or the duration of the reaction time makes it possible to introduce any number of nitro groups per repeating unit up to a maximum of one. Nitro substituted polyphenylene ethers can also be prepared by copolymerization of 3-nitro phenols with the phenols mentioned in the Hay application Serial No. 69,245. A composition in which all of the repeating units contain nitro substituents may be prepared by the homopolymerization of 3-nitro phenols. Polymers prepared either by treatment with nitric acid or by starting with nitro phenols are structurally similar as shown by their infrared spectra and behave chemically in identical manner.

By reduction of the nitrated polymer, nitrosohydroxyl amino, or amino groups are substituted on the aromatic nucleus. The amino group is weakly basic and gives the polymer the character of a weak anion exchanger. The hydrogen atoms of the amino group may be replaced by one or two alkyl groups and the resulting polymer has weak anion exchange properties. Exhaustive alkylation yields the quaternary compound which has stronger ion exchange characteristics.

Amino substituted polyphenylene oxides or eithers may also be obtained by amination of polyphenylene oxides containing chlorine, bromine, or iodine attached to the aromatic nucleus.

The amino and substituted amino compounds are useful as anion exchange materials and as intermediate compounds for the production of other substituted products, e.g., they can be reacted with epoxides to yield products with chelating properties which are useful for the selective separation of ionic species. The amino compounds can be diazotized to yield the diazonium salts, which are important intermediates for the production of dyes (by coupling with appropriate aromatic compounds).

It is surprising that the polymeric diazonium compounds react in many instances in the same way as simpler, monomeric diazonium compounds. By similar procedures as described for common aromatic diazonium compounds (ref. K. H. Saunders, The Aromatic Diazo Compounds and Their Technical Applications, London, Edward Arnold and Co., 2nd ed., 1949, chapter VIII) the diazonium groups may be replaced with other functional groups, such as halogens, CN, CNO, CNS, $PCl_2$, $AsCl_2$, etc., which in turn can be converted to other groups e.g., CN to COOH, CN to $CNH_2$; $PCl_2$ to $PO_2H_2$ and $PO_3H_2$; $AsCl_2$ to $AsO_2H_2$ and $AsO_3H_2$, etc., to yield polymers with ion exchange properties.

The diazonium compounds are light sensitive and can be used for diazo type applications (ref. Encyclopedia of Chemical Technology, The Interscience Encyclopedia, Inc., New York 1953, vol. 11, pp. 147–148). A particular advantage of the polymeric diazonium compounds of this invention is that they can be formed into homogeneous sheets, which permit the formation of images of extremely high contrast and resolution by the methods commonly employed for diazo type applications.

Aromatic carboxylic acids can be obtained by reacting the diazonium salt with cuprous cyanide followed by hydrolysis of the nitrile. Another method consists in the oxidation of polyphenylene oxides or ethers containing alkyl or substituted alkyl side chains by means of chromic acid, alkaline permanganate or any other oxidizing agent commonly employed for this purpose. By varying the reaction conditions and/or the starting materials, any number of COOH groups from 0 to 2 may be introduced per repeating unit of the polymer.

The oxidation may also be conducted stepwise under milder oxidating conditions. Alcohols and aldehydes may be isolated in this way. Reaction of the polyphenylene oxides or ethers containing methylene halide substituents with silver hydroxide yields the alcohols and with dimethyl sulfoxide the aldehydes.

Preparation of the compositions of matter of this invention is in accordance with the following examples which are to be considered illustrative rather than limiting:

Example 1

Poly-(2,6-dimethyl phenylene oxide) (50 grams) of an intrinsic viscosity in chloroform at 30° C. of 1.2 dl./g. was dispersed in 750 ml. 70% nitric acid and cooled to 0° C. with ice. The mixture was allowed to warm up to room temperature and was stirred for four hours. The polymer was filtered off, washed with water and methanol, and dried. The yield was 61.5 grams which analyzed 5.25% nitrogen (0.54 $NO_2$ groups per repeating unit). The infrared spectrum showed absorptions at 6.55 and 7.33 microns characteristic for aromatic —$NO_2$.

By way of checking the composition, 50 grams of 3-nitro-2,6-dimethyl phenol were polymerized by the method described in Hay application Serial No. 69,245. The product had an infrared spectrum identical to that of nitrated poly-(2,6-dimethyl phenylene oxide), except that the absorptions at 6.55 and 7.33 microns due to —$NO_2$ were stronger.

Example 2

The nitrated polymer (20 grams) was dispersed in a solution of 200 grams $SnCl_2 \cdot 2H_2O$ in 300 ml. concentrated hydrochloric acid, and the suspension boiled under reflux for two and one-half hours. After cooling, the polymer was filtered off, washed with concentrated hydrochloric acid, and dried in vacuo. This product (8.7 grams) was dissolved in 1:1 water-methanol. Aqueous ammonia was added until the polymer had completely precipitated. The precipitate was filtered off, washed with acetone, and dried in vacuo to produce poly-(3-amino-2,6-dimethyl phenylene oxide).

Example 3

The amino polymer (4 grams) was dissolved in 1:1 water-methanol acidified with some hydrochloric acid. The solution was cooled with ice and 3 grams of sodium nitrite dissolved in water was added. A small portion of the resulting solution was added to an alkaline solution of β-naphthol in water. Immediately a deep red precipitate was formed indicating diazotization.

Example 4

The remaining solution of the diazotate from Example 3 was neutralized with aqueous sodium hydroxide and added to a solution of cuprous chloride in aqueous potassium cyanide. After standing one-half hour at room temperature, the solution was heated an additional two hours on a steam bath. The polymer was filtered off, washed with methanol, and dried. Its infrared spectrum showed an absorption at 4.5 microns which is characteristic for —CN. The product was suspended in 50 ml. isopropanol, 7 ml. 40% sodium hydroxide, and 12 ml. 30% hydrogen peroxide and refluxed for five hours. To complete the hydrolysis, the solids were next filtered off, suspended in concentrated HCl, and treated with 3 grams of $NaNO_2$ in aqueous solution. After heating on the steam bath for one and one-half hours, the solids were filtered off, washed thoroughly with water and methanol, and resuspended in 100 ml. 0.1165 N sodium hydroxide. The following morning, the suspension was filtered and the filtrate titrated to neutral (methyl red) with 9.05 ml. 1.025 N HCl. The solids were washed with water and methanol and dried. Yield was 1.2 grams. The acid strength of the material was accordingly $$\frac{100 \times 0.1165 - 9.05 \times 1.025}{1.2} = 2.0 \text{ milliequivalents per gram}$$

This corresponds to approximately 0.28 COOH groups per repeating monomer unit.

Example 5

The amine hydrochloride (10 grams) from Example 2 was dissolved in 100 ml. methanol and refluxed three hours with 50 grams of $NaHCO_3$ and 25 ml. dimethylsulfate. The precipitate after cooling was filtered off, washed with methanol, treated with aqueous ammonia, and dried. A small portion of the product was dissolved in aqueous methanol and HCl and treated with $NaNO_2$ solution, as in Example 3. No diazotization occurred and the solution did not cause the formation of a red azo dye upon addition to an alkaline solution of β-naphthol. The dimethyl amino derivative (1 gram) was refluxed six hours with 50 ml. allyl bromide. The excess allyl bromide was removed on the steam bath and the residue dried in vacuo over concentrated sulfuric acid. The bromine content of the product was 14.6% so that approximately 0.32 quaternary ammonium group per repeating monomer unit were present.

Ion exchange materials in general are solid or liquid, water insoluble materials, containing ions of a particular species and electrical charge, which are readily and stoichiometrically exchanged for ions of a different species, but of the same electrical charge, when the material is brought into contact with a solution containing such ions.

Of special importance is the group of ion exchange materials, consisting of a polymeric network to which ionizable groups are chemically attached. Such groups may be acidic in character, such as sulfonic acid, sulfinic acid, phosphonic acid, phosphonous acid, arsenic acid, arsenous acid, carbonic acid, etc., in which case the hydrogen ion is readily exchanged for other cations. These materials are therefore usually referred to as cation exchange materials.

On the other hand, the attached groups may be alkaline in character, such as primary, secondary, tertiary amino and quaternary ammonium groups, sulfonium groups, phosphonium groups, etc., in which case the hydroxyl ion is readily exchanged for other anions. These materials are, therefore, usually referred to as anion exchange materials.

If the acid group of a cation exchange resin in water medium is fully ionized such as the sulfonic acid group, the material is a strong cation exchange material. If, on the other hand, the acidic group is only slightly ionized under these conditions, such as the carboxylic acid group, the material is a weak cation exchange material.

If the acidic group is not completely ionized under these conditions but to an appreciable extent, such as the phosphonic acid group, the material is an intermediate cation exchange material.

Similarly, a strong anion exchange material contains a completely ionized alkaline group, such as the quaternary ammonium group, whereas a weak anion exchange material contains an alkaline group which is only slightly ionized in water, such as a primary, secondary, or tertiary amino proup.

Ion exchange materials are useful in many varied applications. Strong cation exchange resins in the acid form may be used to remove other cations from a solution and strong anion exchange resins may be used to remove other anions from a solution and, in particular, a combination of strong cation and anion exchange resins may be used to demineralize water.

Weak cation exchange materials in the acidic form will readily remove strong basic cations, such as the alkali and alkaline earth metal ions, from solutions but will not readily absorb weakly basic cations, such as ammonium ions, from solution, thus enabling a separation of the different species. Weak anion exchange resins similarly will selectively remove strong acids from a solution containing both strong and weak acids, such as hydrochloric acid and amino acids. Another advantage of weak ion exchange materials is that a stoichiometric amount of strong acid or base is sufficient to restore the material from its salt form to its acid or alkaline form, whereas strong ion exchange materials require an excess reagent for this purpose.

Certain applications for ion exchange materials require that the material be prepared in sheet form. Such ion exchange membranes are useful in electrodialysis apparatus for water purification and preparation of certain chemicals, in certain type fuel cells, in which they provide the electrolyte, and many other applications. It is advantageous when the ion exchange material itself can be formed into a sheet of sufficient strength without the need for a reinforcing material such as an inert polymeric binder or reinforcing cloth or metal screen. After introduction of functional groups onto the polymeric phenylene oxide matrix as described in this invention the resulting materials can be formed into sheets, which are useful for the above mentioned applications insofar as they contain ionizable groups.

The aryl-substituted ethers of the present invention provide compositions of matter which are useful as ion exchange resins and membranes. Of particular interest is the quaternary ammonium derivative as it has strong anion exchange properties. It may be solvent cast into a membrane by dissolving in a volatile solvent, pouring the solution on a smooth surface, and allowing the solvent to volatilize.

While the invention has been described with reference to certain specific embodiments, it is obvious that there may be many variations which fall within the true spirit of the invention. Therefore, the invention should be limited in scope only as may be necessitated by the scope of the appended claims.

What I claim as new and desire to secure by Letters Patent of the United States is:

1. A resin having a repeating structural unit of the formula:

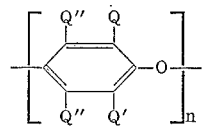

wherein the oxygen atom of one unit is connected to the benzene nucleus of the adjoining unit, $n$ is a positive integer and is at least 100, Q is a monovalent substituent selected from the group consisting of hydrogen, aliphatic hydrocarbon radicals free of a tertiary $\alpha$-carbon atom, aliphatic halohydrocarbon radicals having at least two carbon atoms and being free of a tertiary $\alpha$-carbon atom; Q' is a monovalent substituent which is the same as Q and in addition halogen, arylhydrocarbon radicals, haloarylhydrocarbon radicals alkoxy radicals having at least two carbon atoms and being free of an aliphatic tertiary $\alpha$-carbon atom, and haloalkoxy radicals having at least two carbon atoms and being free of an aliphatic tertiary $\alpha$-carbon atom; and Q'' is the same as Q' and in addition nitro, amino, diazo, nitrile, carboxyl, quaternary ammonium, $PX_2$, $AsX_2$ (in which X is halogen), $PO_3H_2$, $PO_2H_2$, $AsO_2H_2$ and $AsO_3H_2$, there being at least one member selected from the group consisting of nitro, amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$ present in a substantial portion of the units.

2. A resin as claimed in claim 1 wherein Q and Q' are aliphatic hydrocarbon radicals free of tertiary $\alpha$-carbon atoms, one Q'' is hydrogen, and the other Q'' is selected from the group consisting of nitro, amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$.

3. A resin as claimed in claim 2 wherein a substantial portion of the other Q'' is quaternary ammonium.

4. A resin as claimed in claim 3 wherein Q and Q' are methyl groups.

5. A resin as claimed in claim 3 wherein Q is methyl and Q' is ethyl.

6. A resin as claimed in claim 3 wherein Q is methyl and Q' is hydrogen.

7. A film of a homopolymer comprising in sheet form a material having a repeating structural unit of the formula:

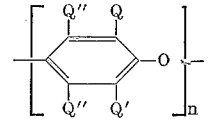

wherein the oxygen atom of one unit is connected to the benzene nucleus of the adjoining unit, $n$ is a positive integer and is at least 100, Q is a monovalent substituent selected from the group consisting of hydrogen, aliphatic hydrocarbon radicals free of a tertiary $\alpha$-carbon atom, aliphatic halohydrocarbon radicals having at least two carbon atoms and being free of a tertiary $\alpha$-carbon atom; Q' is a monovalent substituent which is the same as Q and in addition halogen, arylhydrocarbon radicals, haloarylhydrocarbon radicals, alkoxy radicals having at least two carbon atoms being free of an aliphatic tertiary $\alpha$-carbon atom, and haloalkoxy radicals having at least two carbon atoms and being free of an aliphatic tertiary $\alpha$-carbon atom; and Q'' is the same as Q' and in addition nitro, amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$, there being at least one member selected from the group consisting of nitro, amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$ present in a substantial portion of the units.

8. A resin as claimed in claim 7 wherein Q and Q' are aliphatic hydrocarbon radicals free of tertiary α-carbon atoms, one Q'' is hydrogen, and the other Q'' is selected from the group consisting of nitro, amino, diazo, nitrile, carboxyl, quaternary ammonium, $PX_2$, $AsX_2$, in which X is halogen, $PO_3H_2$, $PO_2H_2$, $AsO_3H_2$ and $AsO_2H_2$.

9. A resin as claimed in claim 8 wherein a substantial portion of the other Q'' is quaternary ammonium.

10. A resin as claimed in claim 8 wherein Q and Q' are methyl groups.

References Cited by the Examiner

UNITED STATES PATENTS 2,543,666  2/1951  Michael _____ 260—2.1
3,134,753  5/1964  Kwiatek _____ 260—47

FOREIGN PATENTS 1,234,336  5/1960  France.

OTHER REFERENCES

Hayes et al.: Chem. Soc. Jour., pp. 2823–31 (1956).
Gregor et al.: Journal American Chemical Society, vol. 77, p. 3675, 1955.
Dewar: J. Chem. Society (London), pp. 917–922 (1958).
ASTIA, Report AD No. 266452, pp. 6, 7 and 18–21, Nov. 22, 1961.

WILLIAM H. SHORT, *Primary Examiner.*

LOUISE P. QUAST, *Examiner.*

JESSE T. BROWN, JOHN C. MARTIN,
*Assistant Examiners.*